US009950653B1

(12) United States Patent
Burer

(10) Patent No.: US 9,950,653 B1
(45) Date of Patent: Apr. 24, 2018

(54) SEAT SUSPENSION SYSTEM

(71) Applicant: Peter J. Burer, Largo, FL (US)

(72) Inventor: Peter J. Burer, Largo, FL (US)

( * ) Notice: Subject to any disclaimer, the term of this patent is extended or adjusted under 35 U.S.C. 154(b) by 257 days.

(21) Appl. No.: 15/073,090

(22) Filed: Mar. 17, 2016

(51) Int. Cl.
| *A47C 7/02* | (2006.01) |
| *B60N 2/54* | (2006.01) |
| *B63B 29/04* | (2006.01) |
| *F16F 1/373* | (2006.01) |
| *F16F 1/368* | (2006.01) |
| *B60N 2/70* | (2006.01) |
| *F16F 1/02* | (2006.01) |
| *A47C 7/30* | (2006.01) |
| *A47C 7/28* | (2006.01) |

(52) U.S. Cl.
CPC .............. *B60N 2/54* (2013.01); *B63B 29/04* (2013.01); *A47C 7/28* (2013.01); *A47C 7/287* (2013.01); *A47C 7/30* (2013.01); *B60N 2/7058* (2013.01); *B60N 2/7094* (2013.01); *B63B 2029/043* (2013.01); *F16F 1/027* (2013.01); *F16F 1/368* (2013.01); *F16F 1/3683* (2013.01); *F16F 1/3686* (2013.01); *F16F 1/3737* (2013.01)

(58) Field of Classification Search
CPC .......... F16F 1/027; F16F 1/368; F16F 1/3737; F16F 1/3683; F16F 1/3686; A47C 7/30; A47C 7/28; A47C 7/287; B60N 2/7058; B60N 2/7094; B60N 2/54
USPC ..... 297/452.48–452.62, 183.1; 267/110, 103
See application file for complete search history.

(56) References Cited

U.S. PATENT DOCUMENTS

| 2,833,339 A * | 5/1958 | Liljengren ........... B60N 2/7052 297/216.1 |
| 3,046,005 A * | 7/1962 | Raduns ..................... A47C 7/32 267/110 |
| 3,057,613 A * | 10/1962 | Benjamin ................ A47C 7/22 267/103 |
| 3,363,943 A * | 1/1968 | Getz ........................ A47C 7/20 267/110 |
| 3,560,049 A * | 2/1971 | Burton et al. ........... A47C 7/30 267/110 |
| 3,645,550 A * | 2/1972 | Biehl ...................... A47C 7/22 24/265 BC |
| 4,854,643 A * | 8/1989 | Cojocari ............. B60N 2/7047 267/110 |
| 5,269,497 A * | 12/1993 | Barth ..................... A47C 7/025 267/110 |
| 5,316,371 A * | 5/1994 | Bishai .................. B60N 2/7094 297/284.1 |
| 5,624,161 A * | 4/1997 | Sorimachi ................ A47C 7/28 267/112 |
| 5,747,140 A * | 5/1998 | Heerklotz ............ A47C 27/144 248/630 |

(Continued)

*Primary Examiner* — Syed A Islam

(74) *Attorney, Agent, or Firm* — Nicholas Pfeifer; Smith & Hopen, P.A.

(57) ABSTRACT

The present invention is a seat bottom suspension system adapted to provide a varying spring constant. An embodiment includes a first plurality of flat elongated biasing members in communication with at least one axle adapted to translate in a direction generally parallel with the longitudinal axis of the flat elongated biasing members. An embodiment may include a second set of flat elongated biasing members set at a lower height than the first plurality of flat elongated biasing members to provide a progressive increase in the spring constant as the down force seen on the seat increases.

18 Claims, 5 Drawing Sheets

(56) References Cited

U.S. PATENT DOCUMENTS

| | | | | |
|---|---|---|---|---|
| 6,082,825 | A * | 7/2000 | Simon | A47C 7/35 267/101 |
| 6,116,694 | A * | 9/2000 | Bullard | A47C 7/287 267/87 |
| 6,830,297 | B2 * | 12/2004 | Gordon | B60N 2/504 248/580 |
| 7,677,659 | B2 * | 3/2010 | Humer | B60N 2/4228 297/216.1 |
| 8,136,884 | B2 * | 3/2012 | Bullard | D04B 21/18 267/110 |
| 9,839,295 | B2 * | 12/2017 | Robinson | A47C 7/025 |
| 2002/0043870 | A1 * | 4/2002 | Kuster | B60N 2/72 297/452.52 |
| 2007/0040311 | A1 * | 2/2007 | Maas | A47C 7/025 267/142 |

\* cited by examiner

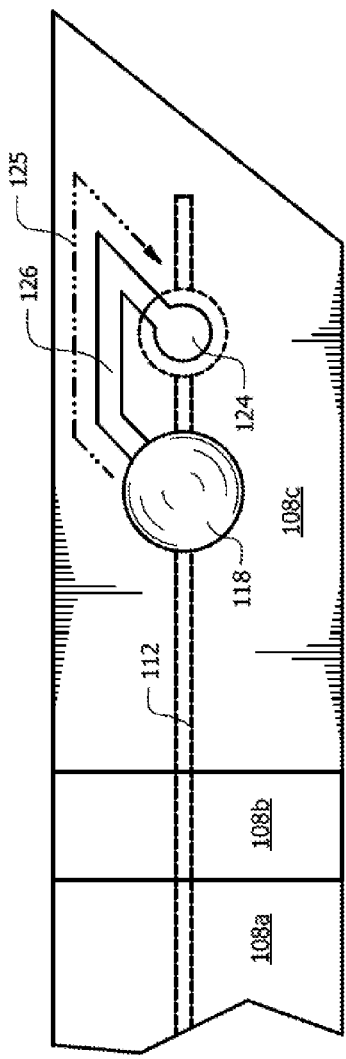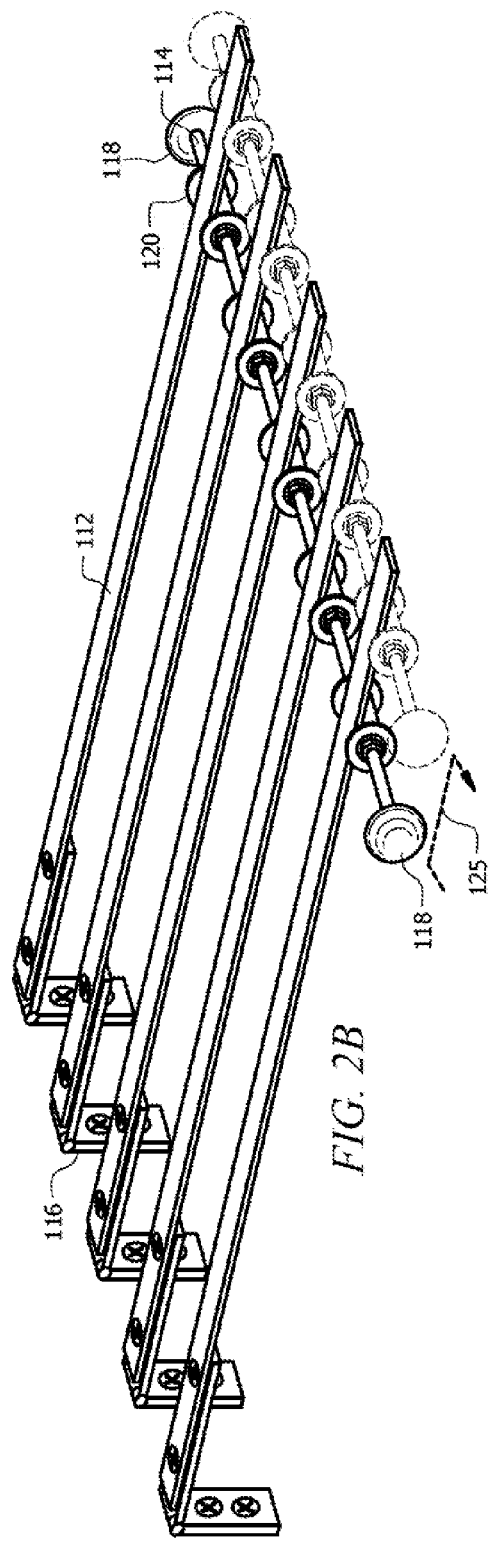

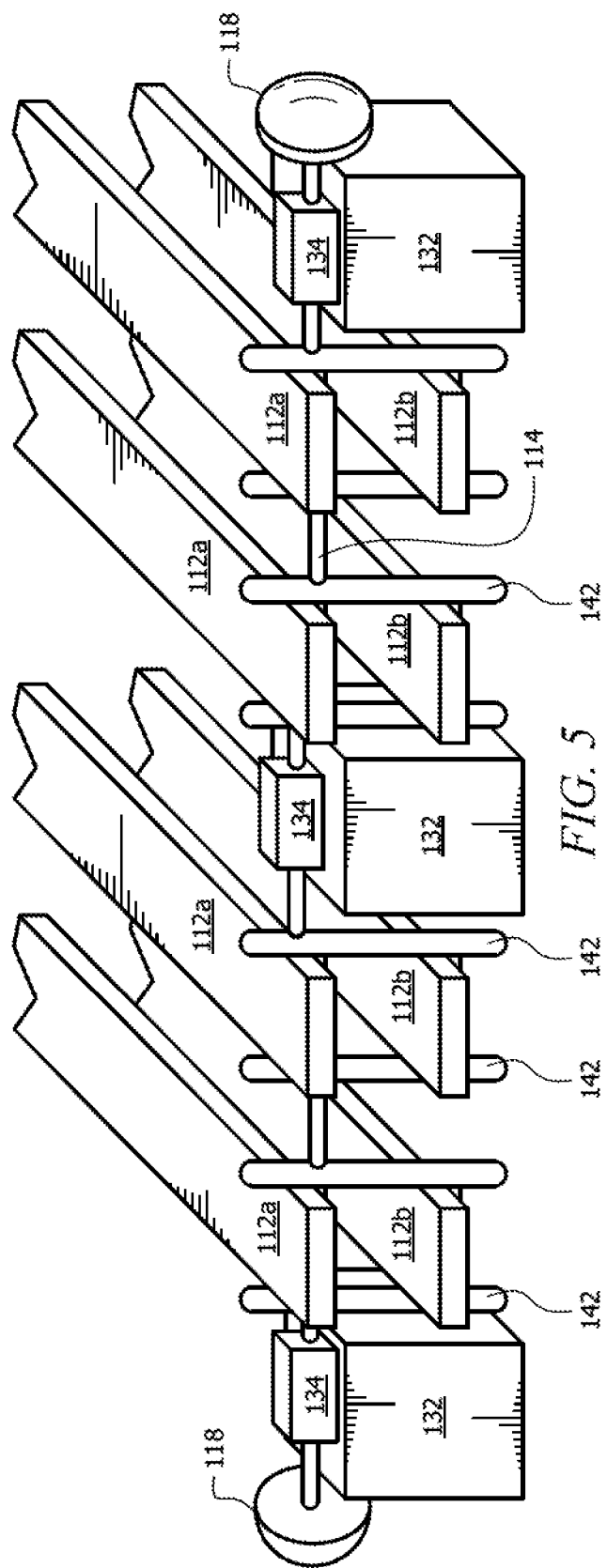

SEAT SUSPENSION SYSTEM

BACKGROUND OF THE INVENTION

1. Field of the Invention

This invention relates, generally, to shock mitigating seat bottoms. More specifically, it relates to a shock-mitigating seat adapted to provide an adjustable/progressive spring constant.

2. Brief Description of the Prior Art

There has been a large increase in the demand for shock-absorbing seat bottoms or platforms in vehicles that often experience impact forces, such as marine and off-road vehicles. Operating a marine vessel in heavy seas or an off-road vehicle in rugged terrain imposes severe forces upon the operator. Standing in such situations is practically impossible so, from a practical standpoint, the operator must be seated. Because an operator is likely seated during such operations, it is imperative that the seat structure manage the loads being imposed therethrough to the operator.

In conventional use, seat bottoms are mostly comprised of a foam seat cushion, which is typically supported by a flexible net of elastic fabric or a steel spring system. Each of these support systems, however, is susceptible to plastic deformation and deterioration over time when exposed to harsh environments such as those in which marine and off-road vehicles typically operate. Therefore, there exists a need for a seat suspension system that is less prone to plastic deformation and deterioration.

In addition, there does not currently exist a system that can provide (1) a progressive spring constant to compensate for spikes in impact forces and/or (2) a user-adjustable spring constant to adjust the comfort level based on the user's weight. Therefore, there also exists a need for a shock-mitigating system providing progressive force mitigation and/or an adjustable level of shock mitigation to compensate for a user's weight, for differing vehicle speeds, environment, and the like.

However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The novel structure of the seat suspension system includes a seat bottom having a base connected to a front wall, a rear wall, and two sidewalls to create an open cavity between the base and the four walls. At least one elongated biasing member is disposed within the open cavity such that a first end is secured near one of the four walls while a second end is in translational communication with an axle. The axle extends through two of the four walls in normal relation thereto, which is also generally perpendicular to the length of the at least one elongated biasing member. The two walls, through which the axle extends, each include at least two apertures separated by a channel extending between the two apertures. The apertures and channel are adapted to receive the axle such that the apertures act as resting/locking locations and the channel enables the axle to traverse between the resting/locking locations. In an embodiment the axle rest on the block resting/locking locations.

In an embodiment, the apertures include one aperture closer to the first end of the elongated biasing member and another aperture closer to the second end of the elongated biasing members. This arrangement thereby provides the elongated biasing members with a greater effective spring constant (stiffness) when the axle is located at the aperture closer to the first end of the elongated biasing member than when the axle is located at the aperture closer to the second end of the elongated biasing member. Its effect is evident when a person is seated on the seat cushion, which generally overlies the seat bottom, at a location generally between the first end and the axle location.

In an embodiment, the axle includes a plurality of guides extending in a radial/perpendicular direction, with respect to the longitudinal axis of the axle, to secure an elongated biasing member to a set location along the length of the axle when the elongated biasing member passes through the guides. The radial direction refers to any perpendicular direction outward from the longitudinal axis of the axle. For example, the guides can be in the form of a circular washer or an elongated vertical member.

An embodiment may include a first plurality of elongated biasing members and a second plurality of elongated biasing members, where each elongated biasing member in the first plurality of elongated biasing members are transversely spaced from one another in a first plane. Similarly, each of the elongated biasing members in the second plurality of elongated biasing members is transversely spaced from each other in a second plane. In addition, the second plurality of elongated biasing members disposed below the first plurality of elongated biasing members. As a result, the second plurality of elongated biasing members is closer to the seat base than the first plurality of elongated biasing members to provide a progressive shock mitigation. The first plurality of elongated biasing members fully absorb impact forces up to a certain magnitude and any force greater than the specific magnitude, results in the seat cushion contacting the second plurality of elongated biasing members, which further absorb the impact force. An embodiment may include more than two tiers of elongated biasing members for greater progressive shock mitigation and/or may include varying magnitudes of spring constant (stiffness) in the elongated biasing members between the different tiers of elongated biasing members.

In an embodiment, the first and second pluralities of elongated biasing members are each in translational communication with the axle. An embodiment may include a handle attached to each end of the axle with the handle located externally with respect to the open cavity. The handle enables a person to manipulate the axle between the two or more apertures in the sidewalls.

In an embodiment, the axle includes a second plurality of guides extending from the axle in a perpendicular direction. The second plurality of guides helps secure the second plurality of elongated biasing members to a set location along the length of the axle. Each guide in the second plurality of guides includes a translation horizontal member. The translation horizontal member is disposed below and in a generally the same plane as the axle, such that the one of the second plurality of elongated biasing members translates across the translation horizontal member while disposed between the translation horizontal member and the axle.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2A is a side view of an embodiment of the present invention, highlighting the translatable ability of the axle.

FIG. 2B is a perspective view of an embodiment of the assembly of the axle and the elongated biasing members.

FIG. 5 is a rear perspective view of an embodiment of the present invention.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
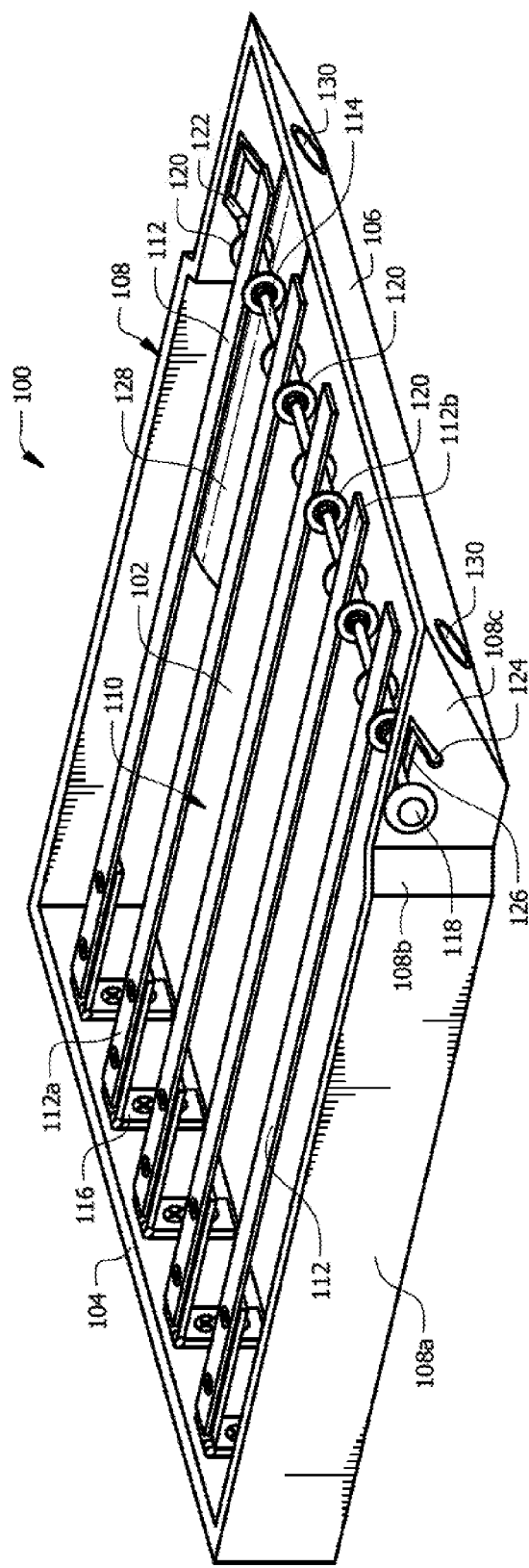
FIG. 1 is a perspective view of an embodiment of the present invention.

The present invention is a seat suspension system having an adjustable and/or progressive spring constant for shock mitigation in seat bottoms. Referring now to FIG. 1, an exemplary embodiment of a seat bottom, generally denoted by reference numeral 100, comprises base 102 having four walls extending therefrom to create an open cavity 110. The four walls comprise front wall 104, rear wall 106, and a pair of sidewalls 108.

Open cavity 110 houses a plurality of elongated biasing members 112 extending generally from front wall 104 towards rear wall 106. Each elongated biasing member 112 includes first end 113 and second end 115. First end 113 is secured near front wall 104 using a hinged L-shaped bracket 116 as shown in FIG. 1. First end 113, however, can be secured on or near front wall 104 through any attachment mechanism known to a person of ordinary skill in the art. Second end 115 of each elongated biasing member 112 is in translational communication with axle 114.

Axle 114 further includes a plurality of guides, each denoted by reference numeral 120. Each guide extends in a perpendicular direction with respect to the axle. A pair of guides 120 provides a channel through which an elongated biasing member 112 is disposed. As shown more clearly in FIG. 2B, each elongated biasing member 112 is secured between a pair of guides 120 to fix each elongated biasing member 112 to a set location along the length of axle 114. Axle 114 may include a bearing or roller means between each pair of guides 120 along which each elongated biasing member 112 may easily translate.

Axle 114 is shown as a thin cylindrical object, but it is possible to employ an axle of another shape. In addition, guides 120 may have any shape so long as the guides can maintain the location of an elongated biasing member to an intended location along the length of the axle.

Axle 114 extends between sidewalls 108 near rear wall 106. Axle 114 has a length greater than the distance between sidewalls 108 such that each end of axle 114 extends through and beyond sidewalls 108 in an outboard direction, i.e. away from open cavity 110. Axle 114 includes a handle 118 secured to each end of axle 114 to allow a user to firmly grasp handle 114 and in turn manipulate axle 114.

Referring now to FIGS. 1 and 2A, sidewalls 108 each include first aperture 122 and second aperture 124 (hidden by handle 118). First aperture 122 and second aperture 124 are connected by channel 126 extending between the two apertures. First apertures 122 are longitudinally spaced with respect to second apertures 124, i.e. in a direction extending along the length of the sidewalls 108, such that first apertures 122 are closer to front wall 104 than second apertures 124. Channel 126 is disposed in each sidewall 108 at a greater height than apertures 122, 124. Apertures 122, 124 act as a notch for receiving axle 114 and handles 118 allow a user to lift and relocate axle 114 between the two apertures as depicted by arrow 125 in FIGS. 2A and 2B. While embodiment 100 includes two apertures 122, 124, any number of apertures may be employed.

The separation between apertures allows axle 114 to effectively alter the length of the elongated biasing members 112, which in turn alters the stiffness of the elongated biasing members 112. When axle 114 is located in the first aperture 122, axle 114 is closer to front wall 104 and elongated biasing members 112 are effectively shorter. Therefore, elongated biasing members 112 have a larger spring constant, i.e. elongated biasing members 112 are stiffer. In contrast, elongated biasing members 112 will have a greater effective length, and thus smaller spring constant, when axle 114 is located in second aperture 124.

As shown most clearly in FIG. 1, each sidewall 108 includes a front straight section 108*a*, which tapers inwards towards open cavity 110, through angled portion 108*b*. Angled portion 108*b* leads to rear straight portion 108*c*, which houses apertures 122, 124. Rear straight portions 108c on each sidewall 108 are closer to one another than front straight portions 108a. This configuration allows the overall length of axle 114 and handles 118 to be less than the distance separating front straight portions 108a. As a result, two seat bottoms can be arranged side by side without compromising the adjustability of axle 114. For example, the front side portion 108a of a first seat bottom can abut the front side portion 108a of a second seat bottom and a user would still have access to handles 118 on each seat bottom.

Seat bottom 100 may also include backrest receivers 128 for receiving a backrest attachment member. Backrest receivers 128 include ports 130 passing through back wall 106, which receive the backrest attachment members.

Figure 3:
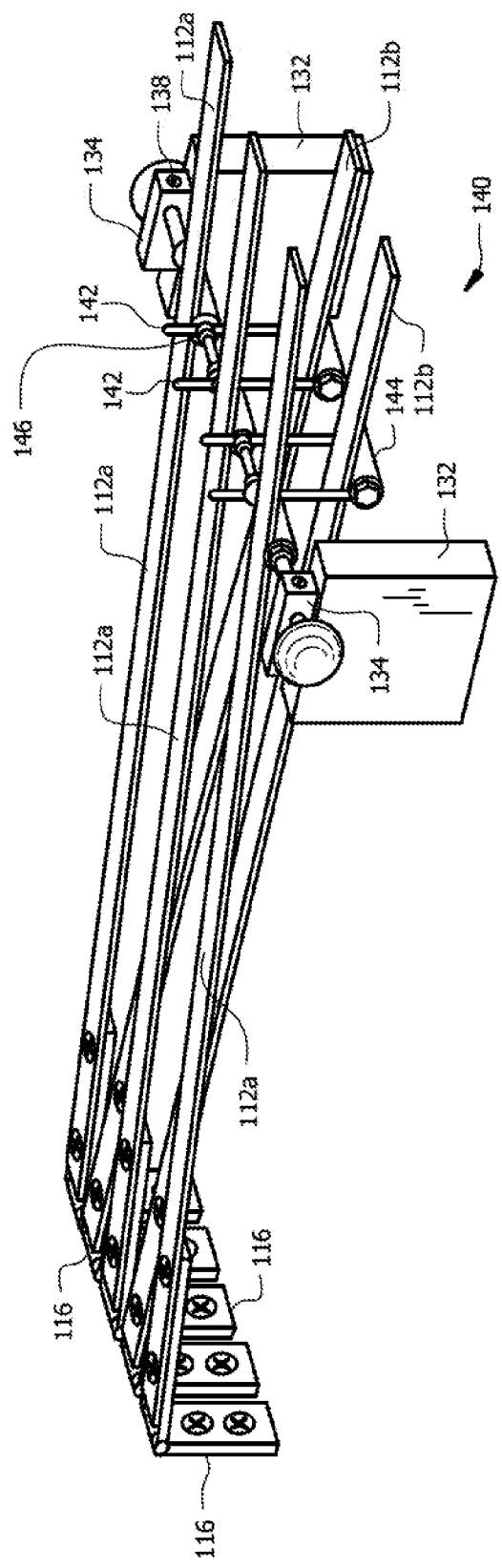
FIG. 3 is a perspective view of an embodiment of the assembly of the axle and the elongated biasing members.

Referring now to FIG. 3, an embodiment includes axle 114 resting on fixed structural member 132 using anti-rotation blocks 134. Fixed structural members 132 are secured to seat base 102 and/or sidewalls 108 and/or back walls 106, and include a flat top wall adapted to mate with a flat bottom wall of anti-rotation block 134. The mating of the two flat surfaces prevents rotation between fixed structural member 132 and anti-rotation block 134. It should be noted that base 102 and vertical walls 104-108 are not illustrated in FIG. 3 to reduce clutter and improve clarity. In an embodiment, fixed structural members 132 may be disposed anywhere in the seat bottom along such that axle 114 and a corresponding anti-rotation block 134 can rest on the fixed structural member 132 when axle 114 is located in a resting position.

Figure 4:
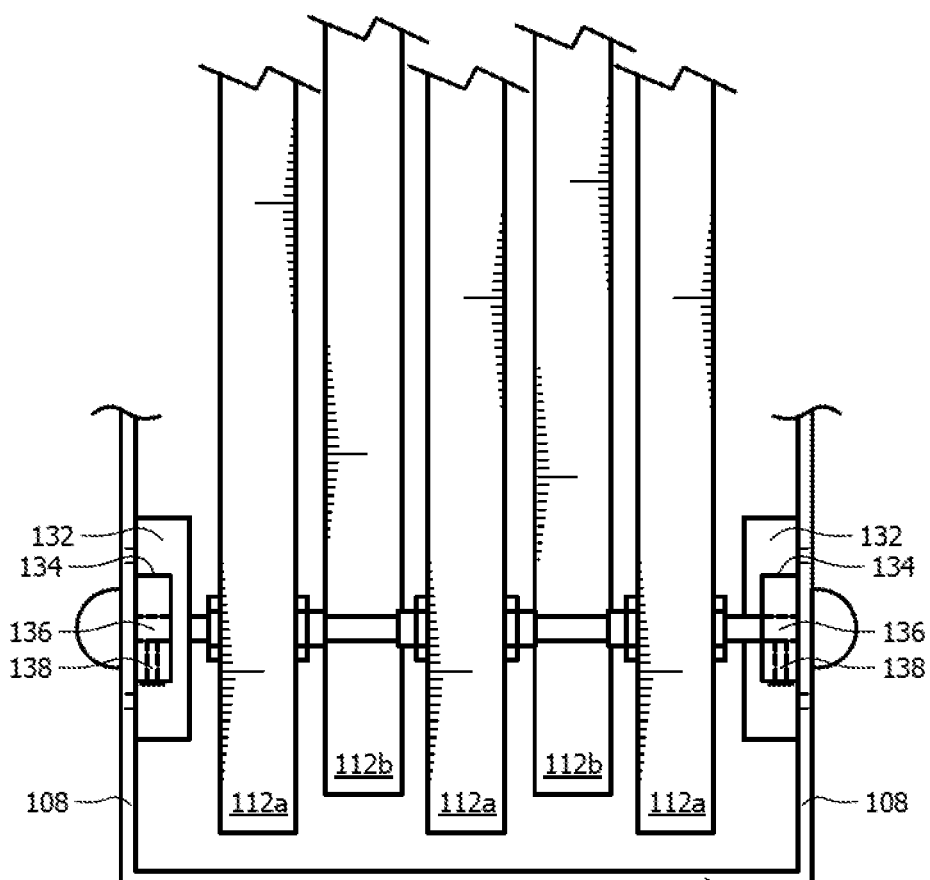
FIG. 4 is a top view of the rear portion of an embodiment of the present invention.

As best illustrated in FIG. 4, anti-rotation blocks 134 further includes axle receiving aperture 136 and set screw 138. Axle receiving aperture 136 receives axle 114 and setscrew 138 prevents axle 114 from rotating with respect to anti-rotation block 134. Setscrew 138 may be any mechanism for preventing rotation of the axle with respect to anti-rotation block 134, such as a cottar pin or through bolt.

The embodiment disclosed in FIGS. 3 and 4 further includes a first plurality of elongated biasing members oriented in an upper plane and a second plurality of elongated biasing members oriented in a lower plane. The elongated biasing members oriented in the first plane are individually and collectively denoted by reference numeral 112a, and the elongated biasing members oriented in the second plane are individually and collectively denoted by reference numeral 112b. First plurality of elongated biasing members 112a includes each elongated biasing member 112a transversely spaced from one another in the first plane and second plurality of elongated biasing members 112b includes each elongated biasing member 112b transversely spaced from one another in a second plane.

Because of multiple planes of elongated biasing members, this embodiment offers a progressively increasing spring constant (stiffness) based on the travel conditions and the user's body weight. The overall spring constant of the seat bottom increases as a user's weight overcomes first plurality of elongated biasing members 112a and the seat cushion contacts second plurality of elongated biasing members 112b.

As best shown in FIG. 3, second plurality of elongated biasing members 112b are secured in a lower plane than first plurality of elongated biasing members 112a through trusses 140 extending down from axle 114. Each truss 140 preferably includes two vertical members 142 in connection with axle 114 and horizontal member 144. Vertical members 142 are preferably secured to a specific location along the length of axle 114 using truss collars 146 or another mechanism capable of securing vertical members 142 to a set location along axle 114. Horizontal member 144 may be cylindrical in nature and/or may include a bearing to allow elongated biasing member 112b to slide along horizontal member 144 when a load is applied/removed from elongated biasing member 112b.

Truss collars 146 preferably include setscrews, cottar pins, or through bolts connected to the main axle shaft to prevent the trusses from swinging when a spring pressure is applied to second plurality of elongated biasing members 112b. Further, truss collars 146 and anti-rotation blocks 134 work in tandem to prevent both axle 114 and trusses 140 from rotating and swinging when a spring pressure is applied to second plurality of elongated biasing members 112b.

Vertical members 142 also aid in securing the elongated biasing members 112a to fixed locations along the length of axle 114. An embodiment may include separate guides for each elongated biasing member 112a.

In an embodiment, anti-rotation blocks 134 may be secured to structural member 132 to prevent axle 114 from translating in the fore and aft directions to alter the spring constant of the system. Such an embodiment provides a progressive spring constant by employing several tiers of elongated biasing members. Each tier includes a plurality of elongated biasing members disposed in the same, generally horizontal, plane and the tiers are vertically spaced with respect to each other.

Referring now to FIG. 5, an embodiment includes three structural members 132 for supporting axle 114 when the axle is secured in a resting location. Additional structural members 132 provide greater stability to the system.

The embodiment in FIG. 5 further includes a first plurality of elongated biasing members 112a oriented in an upper plane and a second plurality of elongated biasing members 112b oriented in a lower plane. First plurality of elongated biasing members 112a are disposed in overlying, but vertically spaced relation with respect to second plurality of elongated biasing members 112b, such that each elongated biasing member 112a is vertically aligned with an elongated biasing member 112b. Vertical members 142 from trusses 140 extend above axle 114 to also secure the location of elongated biasing members 112a at the same fixed location along the length of the axle.

In an embodiment, axle 114 may have a crankshaft design, such that trusses 140 are unnecessary in providing second plurality of elongated biasing members 112b a point of contact for second ends 115. Another embodiment may include several tiers of elongated biasing members to create a seat bottom with a several tier progressive spring constant. An embodiment may employ several axles at varying heights to create different planes of elongated biasing members. In an embodiment, the seat bottom may employ both a translatable axle and multiple tiers of elongated biasing members.

In an embodiment, the elongated biasing member is a made of a competent composite material or matrix, such as fiberglass.

Glossary of Claim Terms

Elongated: refers to an object being long in relation to its width.

Elongated Biasing Member: is an elongated relatively thin resilient member, reacting as a spring to forces applied to a surface.

Spring Constant: is a ratio of load to deflection.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A seat suspension system, comprising:
a seat bottom having a base with four walls extending upwards therefrom, wherein the four walls include a front wall, a rear wall, and two sidewalls;
an open cavity created between the base and the four walls;
at least one elongated biasing member disposed within the open cavity, wherein the elongated biasing member further includes:
a first end secured near one of the four walls;
a fixed length extending to a second end, wherein the second end is in translational communication with an axle;
the axle disposed in a generally perpendicular relation with respect to the length of the at least one elongated biasing member and passes through two of the four walls in normal relation thereto; and
the two of the four walls each include at least two apertures separated by a channel extending between the two apertures, wherein the apertures and channel are adapted to receive the axle such that the apertures act as resting locations and the channel enables the axle to traverse between the resting locations.

2. The seat suspension system of claim 1, wherein the at least two apertures include one aperture closer to the first end of the elongated biasing member and another aperture closer to the second end of the elongated biasing member, such that the elongated biasing member includes a greater spring constant when the axle is located at the one aperture closer to the first end of the elongated biasing member than when the axle is located at the aperture closer to the second end of the elongated biasing member.

3. The seat suspension system of claim 1, wherein the axle includes a set of guides extending in a perpendicular direction to secure an elongated biasing member to a set location along the length of the axle when the elongated biasing member passes through the set of guides.

4. The seat suspension system of claim 1, further comprising:
a first plurality of elongated biasing members and a second plurality of elongated biasing members, wherein the first plurality of elongated biasing members includes each elongated biasing member transversely spaced from one another in a first plane and the second plurality of elongated biasing members includes each elongated biasing member transversely spaced from one another in a second plane; and
the second plurality of elongated biasing members disposed below the first plurality of elongated biasing members, such that the second plurality of elongated biasing members is closer to the seat bottom than the first plurality of elongated biasing members.

5. The seat suspension system of claim 4, wherein the first and second plurality of elongated biasing members are each in translational communication with the axle.

6. The seat suspension system of claim 1, further comprising a handle attached to a first and a second end of the axle, wherein the handle is externally located with respect to the open cavity.

7. A seat suspension system, comprising:
a seat bottom having a base with four walls extending upwardly therefrom, wherein the four walls include a front wall, a rear wall, and two sidewalls;
an open cavity created between the base and the four walls;
a first plurality of elongated biasing members disposed within the open cavity, wherein each elongated biasing member in the first plurality of elongated biasing members is transversely spaced from one another in a first plane and includes:
a first end secured near one of the four walls;
a fixed length extending to a second end, wherein the second end is in translational communication with an axle;
a second plurality of elongated biasing members disposed within the open cavity, wherein each elongated biasing member in the second plurality of elongated biasing members is transversely spaced from one another in a second plane and includes a first end secured near one of the four walls and a fixed length extending to a second end;
the second plurality of elongated biasing members disposed below the first plurality of elongated biasing members, such that the second plurality of elongated biasing members are disposed closer to the seat bottom than the first plurality of elongated biasing members; and
the axle disposed in a generally perpendicular relation with respect to the length of the first plurality of elongated biasing member and secured within the open cavity.

8. The seat suspension system of claim 7, further comprising:
the axle extending through two of the four walls in perpendicular relation thereto; and
the two of the four walls each including at least two apertures separated by a channel extending between the two apertures, wherein the apertures and channel are adapted to receive the axle such that the apertures act as resting locations and the channel enables the axle to traverse between the resting locations.

9. The seat suspension system of claim 8, wherein the at least two apertures include one aperture closer to the first end of the elongated biasing member and another aperture closer to the second end of the elongated biasing member, such that the elongated biasing member includes a greater spring constant when the axle is located at the one aperture closer to the first end of the elongated biasing member than when the axle is located at the aperture closer to the second end of the elongated biasing member.

10. The seat suspension system of claim 7, wherein the axle includes a first plurality of guides extending in a perpendicular direction, wherein a pair of guides secures one of the first plurality of elongated biasing members to a set location along the length of the axle when one of the first plurality of elongated biasing members passes through the pair of guides.

11. The seat suspension system of claim 10, further comprising:
a second plurality of guides extending from the axle in a perpendicular direction, wherein a pair of guides from the second plurality of guides secures one of the second plurality of elongated biasing members to a set location along the length of the axle when one of the second plurality of elongated biasing members passes through the pair of guides; and the pair of guides from the second plurality of guides each including a translation horizontal member, wherein the translation horizontal member is disposed below and in a generally the same plane as the axle, such that the one of the second plurality of elongated biasing members is disposed between the translation horizontal member and the axle and translates across the translation horizontal member.

12. The seat suspension system of claim 7, further comprising a handle attached to a first and a second end of the axle, wherein the handle is externally located with respect to the open cavity.

13. The seat suspension system of claim 7, wherein the first end of the first plurality of elongated biasing members and the first end of the second plurality of elongated biasing members are secured near the front wall of the seat bottom and the first and second plurality of elongated biasing members extend towards the rear wall of the seat bottom.

14. A seat suspension system, comprising:
a seat bottom having a base connected to four walls, wherein the four walls include a front wall, a rear wall, and two sidewalls;
an open cavity created between the base and the four walls;
a first plurality of elongated biasing members disposed within the open cavity, wherein each elongated biasing member in the first plurality of elongated biasing members is transversely spaced from one another in a first plane and includes:
a first end secured near the front wall of the seat bottom;
a fixed length extending to a second end, wherein the second end is in translational communication with an axle;
a second plurality of elongated biasing members disposed within the open cavity, wherein each elongated biasing member in the second plurality of elongated biasing members is transversely spaced from one another in a second plane and includes a first end secured near the front wall of the seat bottom and a fixed length extending to a second end, wherein the second end is in translational communication with the axle;
the second plurality of elongated biasing members disposed below the first plurality of elongated biasing members, such that the second plurality of elongated biasing members is closer to the seat bottom than the first plurality of elongated biasing members;
the axle disposed in a generally perpendicular relation with respect to the length of the first plurality of elongated biasing members and extending through the two sidewalls; and
each of the two sidewalls including at least two apertures separated by a channel extending between the two apertures, wherein the apertures and channel are adapted to receive the axle such that the apertures act as resting locations and the channel enables the axle to traverse between the resting locations.

15. The seat suspension system of claim 14, wherein the at least two apertures include one aperture closer to the first end of the elongated biasing member and another aperture closer to the second end of the elongated biasing member, such that the elongated biasing member includes a greater spring constant when the axle is located at the one aperture closer to the first end of the elongated biasing member than when the axle is located at the aperture closer to the second end of the elongated biasing member.

16. The seat suspension system of claim 14, wherein the axle includes a first plurality of guides extending in a perpendicular direction, wherein a pair of guides secures one of the first plurality of elongated biasing members to a set location along the length of the axle when one of the first plurality of elongated biasing members passes through the pair of guides.

17. The seat suspension system of claim 16, further comprising:
a second plurality of guides extending from the axle in a perpendicular direction, wherein a pair of guides from the second plurality of guides secures one of the second plurality of elongated biasing members to a set location along the length of the axle when one of the second plurality of elongated biasing members passes through the pair of guides; and
the pair of guides from the second plurality of guides each including a translation horizontal member, wherein the translation horizontal member is disposed below and in a generally the same plane as the axle, such that the one of the second plurality of elongated biasing members is disposed between the translation horizontal member and the axle and translates across the translation horizontal member.

18. The seat suspension system of claim 14, further comprising a handle attached to a first and a second end of the axle, wherein the handle is externally located with respect to the open cavity.

* * * * *